United States Patent
Hong et al.

(10) Patent No.: US 8,334,066 B2
(45) Date of Patent: Dec. 18, 2012

(54) SECONDARY BATTERY AND MANUFACTURING METHOD THEREOF

(75) Inventors: Eui-Sun Hong, Cheonan (KR); Sung-Jae Cho, Cheonan (KR); Masaki Koike, Cheonan (KR); Yasuaki Hiramura, Cheonan (KR); Jin-Uk Lee, Asan (KR); Jae-Chul Um, Seoul (KR); Jung-Joon Park, Cheonan (KR)

(73) Assignee: Samsung SDI Co., Ltd., Yongin, Gyeonggi-do (KR)

(*) Notice: Subject to any disclaimer, the term of this patent is extended or adjusted under 35 U.S.C. 154(b) by 1660 days.

(21) Appl. No.: 10/743,866

(22) Filed: Dec. 24, 2003

(65) Prior Publication Data
US 2004/0137322 A1    Jul. 15, 2004

(30) Foreign Application Priority Data

Dec. 27, 2002  (KR) .................. 10-2002-0085434
Aug. 22, 2003  (KR) .................. 10-2003-0058268

(51) Int. Cl.
*H01M 2/02* (2006.01)
*H01M 2/14* (2006.01)
*H01M 10/02* (2006.01)

(52) U.S. Cl. ........ 429/121; 429/163; 429/164; 429/176; 429/177; 429/179; 429/185

(58) Field of Classification Search .................. 429/171, 429/174, 184, 176
See application file for complete search history.

(56) References Cited

U.S. PATENT DOCUMENTS

| | | | | |
|---|---|---|---|---|
| 5,976,729 A | * | 11/1999 | Morishita et al. | 429/65 |
| 6,258,480 B1 | * | 7/2001 | Moriwaki et al. | 429/176 |
| 6,830,847 B2 | * | 12/2004 | Ramaswami et al. | 429/171 |
| 2002/0142211 A1 | * | 10/2002 | Nakanishi et al. | 429/94 |
| 2004/0058234 A1 | * | 3/2004 | Slezak | 429/164 |

FOREIGN PATENT DOCUMENTS

| | | |
|---|---|---|
| CN | 1166062 A | 11/1997 |
| EP | 0798794 A1 | 10/1997 |
| EP | 0827230 A2 | 3/1998 |
| EP | 0 899 799 A2 * | 3/1999 |
| EP | 0899799 A2 | 3/1999 |
| EP | 0944119 A1 | 9/1999 |
| EP | 0 959 508 A1 | 11/1999 |
| EP | 0899799 A3 | 4/2000 |

(Continued)

OTHER PUBLICATIONS

Copper and Alloys [online]. H. Cross Company, [retrieved on Apr. 2, 2007]. Retrieved from the Internet: <URL: http://hcrosscompany.com/metals/copper.htm>.*

(Continued)

*Primary Examiner* — Ula C. Ruddock
*Assistant Examiner* — A. Echelmeyer
(74) *Attorney, Agent, or Firm* — Knobbe, Martens, Olson & Bear LLP (57) ABSTRACT

A secondary battery having a simplified structure by which a lead of a safety device can be adhered to the battery includes an electrode unit having a positive electrode plate, a negative electrode plate and a separator disposed therebetween, a can having a bottom portion and made of aluminum or an aluminum alloy, the can in which the electrode unit and an electrolytic solution are accommodated and sealed, and a surface coating provided on at least an outer surface of the bottom portion of the can to which the lead is attached.

13 Claims, 6 Drawing Sheets

FOREIGN PATENT DOCUMENTS

| | | | |
|---|---|---|---|
| JP | 60 124351 | * | 3/1985 |
| JP | 60-124351 | | 7/1985 |
| JP | 60124351 | | 7/1985 |
| JP | 04-184861 | * | 7/1992 |
| JP | 8-329908 | | 12/1996 |
| JP | 08329908 | | 12/1996 |
| JP | 10-21889 | | 1/1998 |
| JP | 11-144690 | | 5/1999 |
| JP | 11-170069 | | 6/1999 |
| JP | 11-265692 | | 9/1999 |
| JP | 2000-67822 | | 3/2000 |
| JP | 2003257411 | | 9/2003 |
| WO | 02/03483 | A1 | 1/2002 |

OTHER PUBLICATIONS

Periodic Table: Copper [online]. Checmical Elements.Com [retrieved on Apr. 2, 2007]. Retrieved from the Internet: <URL: www.chemicalelements.com/elements/cu.html>.*

U.S. Appl. No. 10/727,714, filed Dec. 5, 2003, Ju-hyung Kim, Samsung SDI Co., Ltd.

U.S. Appl. No. 10/737,837, filed Dec. 18, 2003, Chang-seob Kim, Samsung SDI Co., Ltd.

Office Action Issued Sep. 8, 2006 by the Chinese Patent Office for Chinese Patent Application No. 200310123551.9.

* cited by examiner

SECONDARY BATTERY AND MANUFACTURING METHOD THEREOF

CROSS-REFERENCE TO RELATED APPLICATIONS

This application claims the benefit of Korean Patent Application No. 2002-85434, filed on Dec. 27, 2002 in the Korean Intellectual Property Office, and Korean Patent Application No. 2003-58268, filed on Aug. 22, 2003 in the Korean Intellectual Property Office, the disclosures of which are incorporated herein in their entirety by reference.

BACKGROUND OF THE INVENTION

1. Field of the Invention

The present invention relates to a secondary battery and a manufacturing method thereof, and more particularly, a secondary battery which can improve reliability of a safety device of the battery, and a manufacturing method thereof.

2. Description of the Related Art

In general, secondary batteries are rechargeable and can be made into a smaller size with high capacity, and examples of useful secondary batteries include nickel-hydrogen (Ni-MH) batteries, lithium batteries and lithium-ion batteries. Generally, a secondary battery is formed by accommodating a generation element. The generation element generally includes an electrode unit which includes a positive electrode plate, a negative electrode plate and a separator. The electrode unit and an electrolytic solution are combined to form the generation element, and the generation element is disposed in a can made of aluminum or aluminum alloy. An upper opening of the can is sealed using a cap assembly. The secondary battery sealed in the can generally includes an electrode terminal formed at an upper portion of the battery and which is insulated from the can. The electrode terminal serves as one electrode of the battery. In this case, the can of the battery, such as, the bottom surface of the battery, serves as the other electrode of the battery.

As there is demand for small, lightweight secondary batteries, instead of making the battery can of iron, such as a cold-rolled steel sheet, the battery can is made with an aluminum can made of aluminum or an aluminum alloy. Aluminum is used since aluminum is lighter than iron or other conductive metals, which helps to make lightweight batteries. Also, even when the battery can made of aluminum is used for a prolonged period, corrosion is not caused to the battery.

In a battery having a can made of aluminum, however, where an electrode terminal at an upper portion of the can is used as an electrode of the battery and a bottom surface of the battery is used as the other electrode, several problems may be caused during an initial charge/discharge stage of the battery. Charging probes that support the electrode terminal and bottom surface of the battery may be stained with aluminum used for the battery can, which may result in poor appearance of the battery and inaccurate measurement of voltage and current by the probe, causing overcharging.

The sealed secondary battery is generally electrically connected to a safety device, such as a positive temperature coefficient (PTC) element, a thermal fuse or a protecting circuit. The safety device and the sealed secondary battery are encased in a battery pack. Such a safety device, which is connected to positive and negative electrodes of the battery, prevents rupture of a battery by interrupting current flow when the voltage of the battery sharply increases due to a rise in temperature or overcharge/overdischarge of the battery, thereby preventing dangers of the battery.

A safety device of a battery is connected to positive and negative electrodes of the battery through a lead. The lead is generally made of nickel, a nickel alloy or nickel-plated stainless steel to provide a predetermined level of hardness and conductivity. However, a lead made of nickel or a nickel alloy may cause several problems when it is welded to a can made of aluminum or an aluminum alloy. In other words, the infusibility of nickel makes it difficult to perform ultrasonic welding. Additionally, the high electrical, thermal conductivity of aluminum makes it difficult to perform resistance welding due to difficulty of gaining intensive heat at the contact interface. Thus, laser welding may be employed. During laser welding, however, laser beams may be transferred to a protector, resulting in poor reliability.

To overcome the above problems, U.S. Pat. No. 5,976,729, discloses a cell having a safety device, such as a protector. A bottom plate made of nickel or a nickel alloy is laser-welded to a bottom surface of a can made of aluminum or an aluminum alloy. The lead is welded to the bottom plate by resistance welding. However, since the can is very thin, it is necessary to accurately adjust welding strength in order to prevent leakage of an electrolytic solution from a laser-welded portion. Also, since an additional welding step is necessary, the process becomes complex. Further, since laser welding requires an increased facility, the manufacturing cost increases. If a safety vent is provided at the bottom portion of the can, thermal impact may be applied to the safety vent during laser welding, lowering reliability.

Japanese Patent Publication No. hei 8-329908 discloses a battery having a nickel plate compressively adhered to the bottom of a can made of aluminum. In this case, since the nickel plate is inserted into the bottom of the can by compressive adhesion using a physical force, the bottom portion of the can made of aluminum may become weak due to its reduced thickness, resulting leakage of an electrolytic solution. To overcome the drawback, the bottom portion of the can may be thickened, which may adversely affect the overall size of the battery.

SUMMARY OF THE INVENTION

An aspect of the present invention provides a secondary battery having a simplified structure by which a lead of a safety device can be adhered to the battery in an easy, cost-effective and safe manner, thereby improving reliability of the safety device of the battery, and a manufacturing method thereof.

An aspect of the present invention also provides a secondary battery which can prevent contamination of a leading edge of a probe for initial charging and discharging by the aluminum used for a can of the battery, and a manufacturing method thereof.

An aspect of the present invention provides a secondary battery which can adhere a lead of a safety device to the battery without welding, and a manufacturing method thereof.

Additional aspects and/or advantages of the invention will be set forth in part in the description which follows and, in part, will be obvious from the description, or may be learned by practice of the invention.

In accordance with an aspect of the present invention, a secondary battery includes an electrode unit having a positive electrode plate, a negative electrode plate and a separator disposed therebetween, a can having a bottom portion and made of aluminum or an aluminum alloy in which the electrode unit and an electrolytic solution are accommodated and sealed, and a first surface coating provided on at least an outer surface of the bottom portion of the can.

In accordance with another aspect of the present invention, a secondary battery includes an electrode unit having a positive electrode plate, a negative electrode plate and a separator disposed therebetween, a can having a bottom portion and made of aluminum or an aluminum alloy and in which the electrode unit and an electrolytic solution are accommodated and sealed, a cap assembly sealing the can and having a cap plate insulated from the positive and negative electrode plates of the electrode unit and made of aluminum or an aluminum alloy, and a second surface coating provided on at least an outer surface of the cap plate.

In accordance with another aspect of the present invention, a method of manufacturing a secondary battery includes forming an electrode unit by providing a positive electrode plate and a negative electrode plate and interposing a separator therebetween, accommodating the electrode unit and an electrolytic solution inside a can having a bottom portion and sealing the can, forming a first metal layer on an outer surface of the bottom portion of the can by pre-treatment using a material different from a material forming the can, and forming the first surface coating on the outer surface of the bottom portion of the can having the first metal layer.

In accordance with another aspect of the present invention, a method of manufacturing a secondary battery includes forming an electrode unit by providing a positive electrode plate and a negative electrode plate and interposing a separator therebetween, accommodating the electrode unit and an electrolytic solution inside a can having a bottom portion and sealing the can, forming a first metal layer on an outer surface of the bottom portion of the can by pre-treatment using a material different from a material forming the can, and forming the first surface coating on the outer surface of the bottom portion of the can having the first metal layer.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
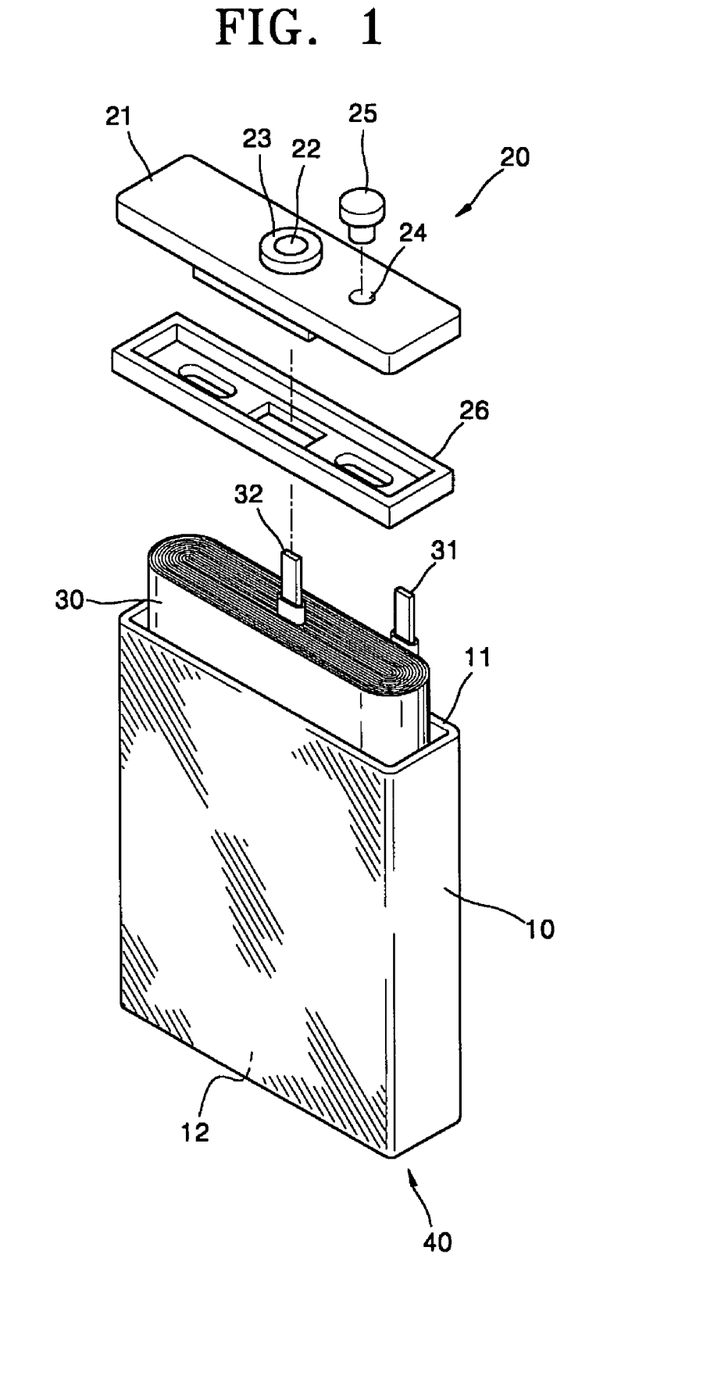
FIG. 1 is an exploded perspective view of a secondary battery according to an embodiment of the present invention.

FIG. 1 is an exploded perspective view of a secondary battery according to an embodiment of the present invention. Referring to FIG. 1, the secondary battery includes a can 10 having an opening 11 at one plane. An electrode unit 30 is accommodated inside the can 10 through the opening 11.

Although not shown in detail, the electrode unit 30 is configured such that a separator is disposed between a positive electrode plate and a negative electrode plate. According to an embodiment of the present invention, shown in FIG. 1, the electrode unit 30 is of a jelly roll type in which a positive electrode plate, a negative electrode plate and a separator disposed therebetween are laminated and wound. However, it is understood that other types of electrode units can be used which are not jelly roll type structures.

The negative electrode plate includes a negative electrode collector made of a strip-like metal foil, and a copper foil can be used as the negative electrode collector. A negative electrode coating portion coated with a negative electrode compound material containing a negative electrode active material is formed on at least one plane of the negative electrode collector. A carbon material can be used as the negative electrode active material. The negative electrode compound material includes a binder, a plasticizer, a conductive material and the like. However, it is understood that negative electrode plates can be made with other materials and compounds.

The positive electrode plate includes a positive electrode collector made of a strip-like metal foil, and an aluminum foil can be used as the positive electrode collector. A positive electrode coating portion coated with a positive electrode compound material containing a positive electrode active material is formed on at least one plane of the positive electrode collector. A lithium oxide can be used as the positive electrode active material. The positive electrode compound material includes a binder, a plasticizer, a conductive material and the like. However, it is understood that the positive electrode plates can be made with other materials and compounds.

As shown in FIG. 1, a positive electrode tab 31 and a negative electrode tab 32 are electrically connected to the corresponding positive electrode plate and the negative electrode plate and are drawn out to the upper portion of the electrode unit 30. A nickel foil and an aluminum foil can be used as the negative electrode tab 32 and the positive electrode tab 31, respectively, but the tabs 31, 32 are not limited thereto. Locations of the positive electrode tab 31 and the negative electrode tab 32 may be opposite to those shown in FIG. 1.

As shown in FIG. 1, according to an embodiment of the present invention, the can 10 can be made of a rectangular metal material. Accordingly, the can 10 itself can serve as a terminal according to an aspect of the invention. According to an embodiment of the present invention, the can 10 can be made of a light, conductive metal such as Al or an Al alloy. The can 10 has the opening 11 at the one plane, and the electrode unit 30 is accommodated inside the can 10 through the opening 11. As shown in FIG. 1, the can 11 may be shaped of a rectangle having angled edges at its lateral sides. Also, although not shown, the edges may be round. Additional configurations can similarly be set or developed according to the intended use.

The cap assembly 20 is sealed with the opening 11 of the can 11. The cap assembly 20 includes a cap plate 21 directly welded with the opening 11 for sealing. The can 10 and the cap plate 21 may be formed of the same metal for increasing weldability.

A terminal pin 22 is formed in the cap assembly 20 so as to penetrate the cap plate 21 via a gasket 23, and an insulating plate (not shown) may be further formed under the terminal pin 22 so that the terminal pin 22 is insulated from the cap plate 21 according to an aspect of the invention. A negative electrode tab 32 is drawn out from a negative electrode plate of the electrode unit 30 and is welded to the lower portion of the terminal pin 22, functioning as a negative electrode terminal. A positive electrode tab 31 is drawn out from a positive electrode plate and is directly electrically connected to the inner surface of the can 10 so that the outer portion of the battery except the terminal pin 22 may function as a positive electrode terminal. However, structures of the positive and negative electrode terminals are not limited to those described above. That is, the positive electrode terminal may be formed using a separate terminal pin, like the negative electrode terminal, and other various structures may be employed.

After the electrode unit 30 is inserted into the can 10, a protective case 26 made of an insulating material is further provided between the electrode unit 30 and the cap assembly 20, thereby fixing the electrode unit 30 in a more secured manner. After the cap assembly 20 is welded to the opening 11 of the can 10, an electrolytic solution is injected into the electrode unit 20 through an inlet 24 formed at the cap plate 21 and sealed using a plug 25 so as to form a generation element with the electrode unit 30. However, the case 26 need not be used in all aspects of the invention. Further, it is understood that the generation element need not use an electrolytic solution, and could instead use a solid electrolyte. Additionally, it is understood that other types of generation elements can be used to generate electrical power.

Figure 2:
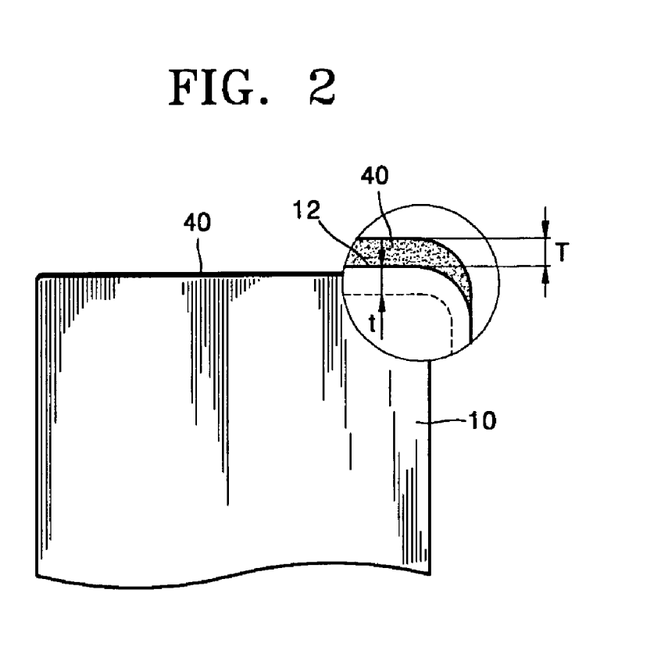
FIG. 2 is a side view partially illustrating a bottom portion of a battery can shown in FIG. 1 on which a surface coating is formed.

In the secondary battery according to an embodiment of the present invention, a first surface coating 40 is provided at the outer surface of the bottom portion 12 of the can 10 as shown in FIG. 2. The thickness (T) of the bottom portion 12 of the can 10 is preferably in the range of 0.2 to 0.8 mm. If the thickness is greater than 0.8 mm, the volume and weight of the battery may increase. If the thickness is less than 0.2 mm, the strength of the battery may be impaired. However, it is understood that the thickness (T) can be otherwise, depending on factors such as the material of the case 10, and that the coating 40 can be any film or layer disposed on the can 10.

In the shown embodiment of the present invention, the first surface coating 40 is provided for the purpose of increasing weldability between a lead of a safety device of the battery and the bottom portion 12. Preferably, the first surface coating 40 can be made of nickel or a nickel alloy having nickel as a main component. However, other material can be used, and the coating 40 can have other purposes in addition to or instead of improving weldability.

According to an aspect of the invention, the composition of the nickel and a nickel alloy in the coating 40 may be the same as that of a conventional nickel plate such as that shown in U.S. Pat. No. 5,976,729 welded to a can 10 made of aluminum, the disclosure of which is incorporated herein by reference. Additionally, according to an aspect of the invention, phosphorus (P), boron (B) or tungsten (W) may be further added thereto in order to obtain desired properties including corrosion resistance.

Figure 3:
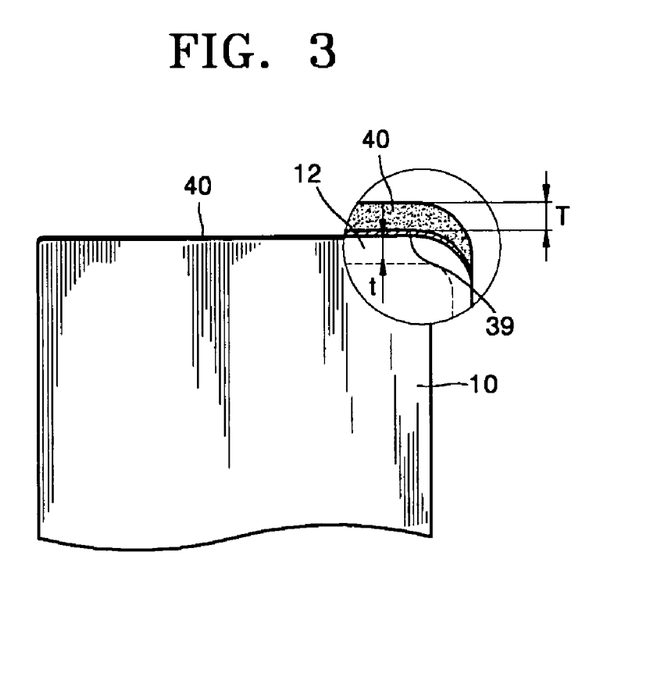
FIG. 3 is a side view partially illustrating a modification of a bottom portion of a battery can shown in FIG. 1 on which a metal layer and a surface coating are formed.

As shown in the embodiment of the invention shown in FIG. 3, a first metal layer 39 is further disposed between the outer surface of the bottom portion 12 and the first surface coating 40. Materials of the first metal layer 39 are different from those of the can 10 and the first surface coating 40. Examples of the first metal layer 39 include Zn, Sn, Fe, Cr and so on. The first metal layer 39 may be formed on the outer surface of the bottom portion 12 by pre-treatment before formation of the first surface coating 40 according to an aspect of the invention. In such a manner, oxidation can be prevented by adjusting an oxidation-reduction level, and an area for reaction between the bottom portion 12 and the first surface coating 40. Adhesion between the bottom portion 12 and the first surface coating 40 can also be increased. Further, surface tension can be increased and the first surface coating 40 can be made uniform. Also, a plating energy required for forming the first surface coating 40 by plating can be reduced and surface irregularities and damages of the bottom portion 12 can be avoided.

According to an aspect of the invention, the first surface coating 40 made of nickel can be formed by a general electrolytic plating method. In electrolytic plating, an oxidation film formed on the surface of the can 10 made of aluminum is first removed by pickling in which the oxidation film is immersed in an acid solution of pH 2 or less. Ni or a Ni alloy is then plated on the surface of the can 10 by immersing the can in a Ni plating bath or a Ni alloy plating bath and by applying current to the bath. Here, the can 10 may be entirely plated, which may, however, increase the overall weight and volume of the can 10. Thus, it is generally preferred that only the bottom portion 12 of the can 10 is plated. To this end, portions other than the bottom portion 12 of the can 10 are preferably screened by an insulating material so as to expose only the bottom portion 12. The first surface coating 40 may be formed only partially at an outer portion of the bottom portion 12 or entirely at the outer portion of the bottom portion 12. The area in which the first surface coating 40 is formed can be adjusted by adjusting the exposed area of the bottom portion 12 when the screening is performed prior to plating.

According to an aspect of the invention, the first surface coating 40 made of nickel may be formed by general electroless plating. Any electroless plating method that can form a nickel-based plating layer on the surface of a can 10 made of aluminum may be applied in forming the first surface coating 40. However, in an embodiment of the present invention, the first surface coating 40 is subjected to zincate pre-treatment in a state in which the can 10 except the bottom portion 12 is screened, and electroless plating of nickel is then performed. The zincate pre-treatment is performed for the purpose of preventing a reduction of aluminum plating reactivity and adhesiveness. That is, a zinc nucleus is formed at the bottom portion 12 using a potential difference between the aluminum can 10 screened except the bottom portion 12 and zinc contained in a zincate solution.

For example, where the can 10 is screened except the bottom portion 12, the surface of the can 10 is degreased using a degreasing solution containing sodium hydroxide (NaOH) and then etched using an etching solution containing sodium carbonate ($Na_2CO_3$) and sodium phosphate ($Na_3PO_4$), thereby removing the oxidation film from the surface of the can 10. The can 10 from which the oxidation film is removed is activated in an activating solution containing nitric acid and is then subjected to zincate treatment in a zincate solution containing zinc oxide (ZnO), sodium hydroxide (NaOH), iron dichloride ($FeCl_3$), or Rochelle salt such as potassium sodium tartrate ($KNaC_4H_4O_6$ $4H_2O$), thereby forming a zinc coating. An electroless nickel plating reaction is initiated at the zinc nucleus formed by the zincate treatment. The zincate pre-treatment can also be applied to the electrolytic plating, and the first metal layer 39 shown in FIG. 3 is formed by the pre-treatment.

The first surface coating 40 can be formed only partially or entirely at the bottom portion 12, and the area thereof can be adjusted by adjusting the exposed area of the bottom portion 12. Alternatively, the nickel-based, first surface coating 40 can be formed directly on at least the bottom portion 12 of the can 10 by sputtering. The sputtering of nickel can be any general sputtering method.

According to another embodiment of the present invention, the first surface coating 40 can be made of copper or a copper alloy containing copper as a main component. The copper-based first surface coating 40 can also be formed by electrolytic plating or electroless plating. It is preferred, but not required, that an oxidation film is removed from the surface of the can 10 prior to plating and a zinc nucleus is created by zincate pre-treatment. Any electrolytic plating or electroless plating can be used for plating of the copper-based, first surface coating 40. The copper-based, first surface coating 40 can also be formed by directly sputtering copper, or in the form of a clad layer.

Specifically and by way of example, an insert material made of pure aluminum is cold-rolled to a copper member (i.e., the first surface coating 40) for adhesion, and the insert material is applied to the bottom portion 12 of the can 10 and adhered by hot pressing. The insert material employing highly pure aluminum allows adhesion with the copper member and the can 10 to be improved.

The thickness (T) of the first surface coating 40 can vary in consideration of the overall height of the battery and the strength of a coating. According to an embodiment of the present invention, the first surface coating 40 may be 0.5 μm to 200 μm in thickness, and preferably between 30 μm to 100 μm. If the thickness of the first surface coating 40 is less than 0.5 μm, uniformity in plating thickness cannot be ensured and imperfect plating (for example, local failure in plating or exfoliation) may occur. If the thickness of the first surface coating 40 is greater than 200 μm, the plating layer becomes overly thick, making it difficult to obtain a spacious internal space of the can 10. When the thickness (T) of the first surface coating 40 is in the range of 30 μm to 100 μm, an appropriate welding strength can be ensured even by welding of a lead 50 (shown in FIG. 5) and an increase in the weight and volume of the battery can also be suppressed.

Therefore, forming the first surface coating 40 can noticeably reduce the thickness of a bottom portion 12 of the can 10 compared to the conventional batteries, where a nickel plate is adhered to the can by welding. Thus, a design margin of a battery pack can be ensured using the present invention. Also, leakage of an electrolytic solution can be prevented during welding using the present invention.

Figure 4:
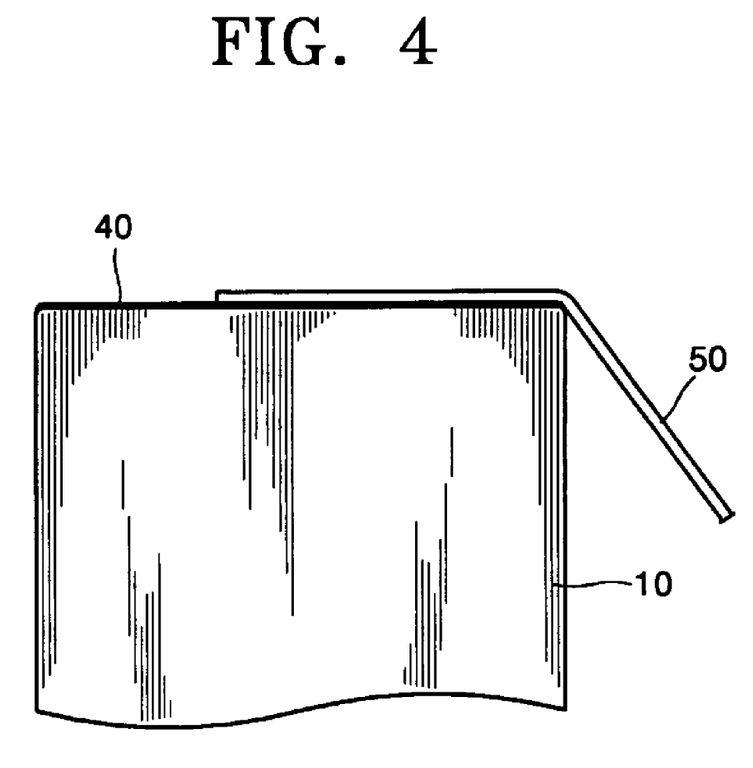
FIG. 4 is a side view partially illustrating an adhesion state in which a lead is adhered to a first surface coating of the bottom portion of the battery can shown in FIG. 1 according to an aspect of the present invention.
Figure 7:
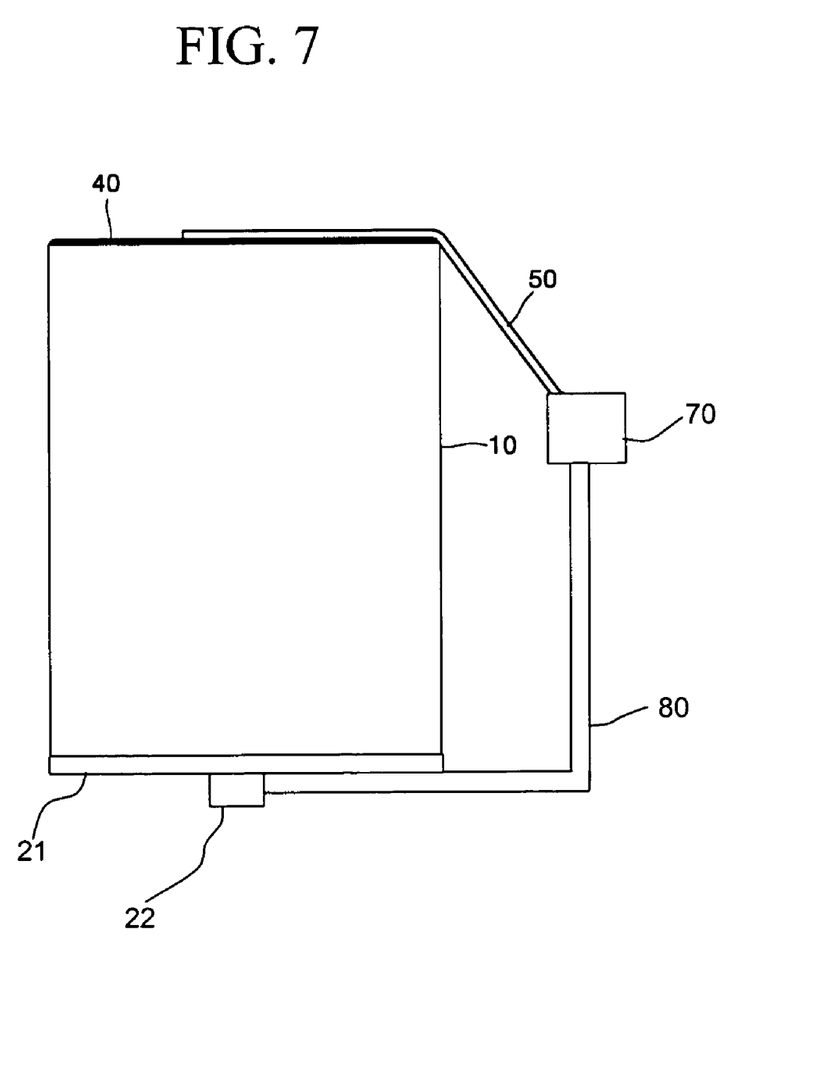
FIG. 7 is a side view illustrating a protector attached to the battery according to an embodiment of the present invention.

After forming the first surface coating 40, a lead 50 is welded to the first surface coating 40 as shown in FIG. 4. As shown in FIG. 7, the lead 50 is connected to a safety device 70 mounted on a battery. Examples of such safety devices 70 include, but are not limited to, a positive temperature coefficient (PTC) element or a protector, and can be made of nickel, a nickel alloy, aluminum or an aluminum alloy. A second lead 80 connects the terminal 22 and the safety device 70.

When the first surface coating 40 is made of nickel or a nickel alloy, the lead 50 can be made to adhere to the coating 40 by welding according to an aspect of the invention. For instance, the welding can be specifically resistance welding, which is the simplest welding method. In addition, ultrasonic welding or laser welding can be employed. Further, adhesion by soldering can also be employed. Thus, unlike in the conventional plate welding, problems of an increase in welding facility due to double welding, leakage of an electrolytic solution and poor reliability of a safety device, can be overcome.

The first surface coating 40 can be made of various materials in addition to the nickel- or copper-based materials according to an aspect of the invention. Specifically, the materials of the first surface coating 40 can be determined by a difference in the melting point between materials of the first surface coating 40 and the lead 50. In other words, resistance welding is the simplest method of adhering the lead 50 to the first surface coating 40 with a high strength, and, for attaining a higher welding strength, a difference in the melting point between materials of the lead 50 and the first surface coating 40 is at or less than 500° C., and preferably at or less than 200° C. Thus, any material having a melting point difference of 500° C. or less (and preferably 200° C. or less) from that of the lead 50 can be used in forming the first surface coating 40.

Figure 5:
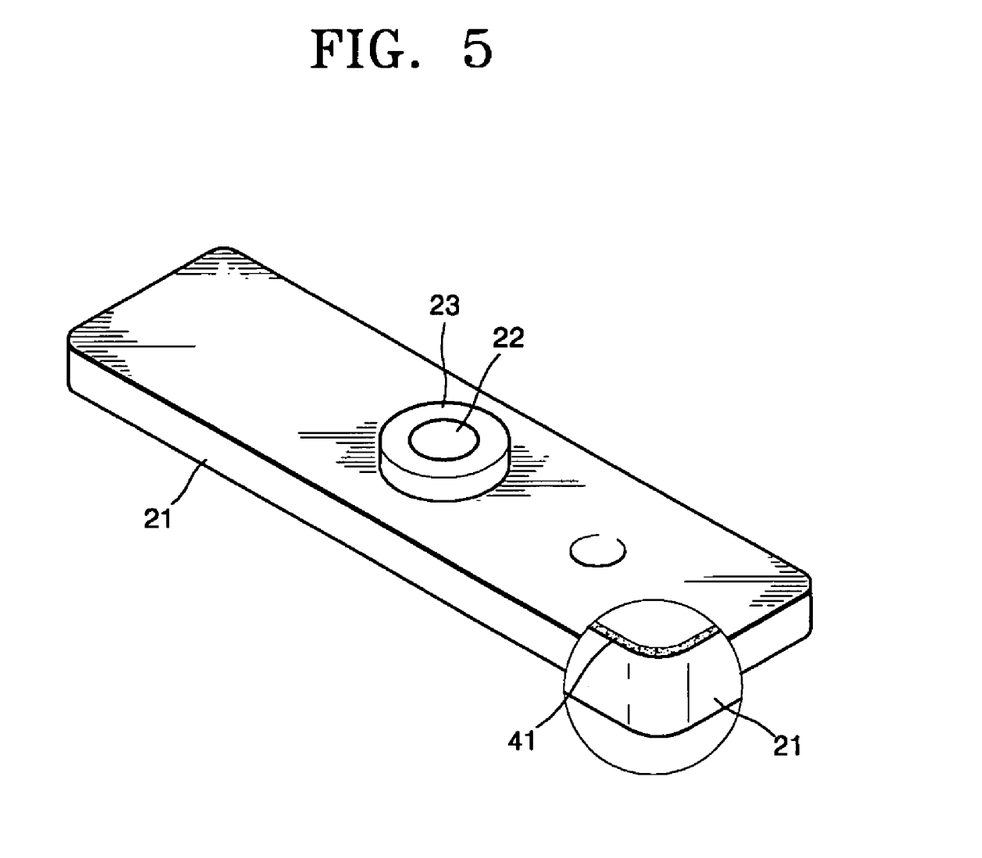
FIG. 5 is a partial perspective view of a cap plate having a second surface coating according to another embodiment of the present invention.

In accordance with another embodiment of the present invention, as shown in FIG. 5, a second surface coating 41 is formed on at least an outer surface of the cap plate 21. In the shown embodiment of the present invention, the second surface coating 41 prevents contamination of a probe of an initial charging/discharging device. While not required, it is preferred that, the second surface coating 41 is made of the same material and by the same method with the first surface coating 40. For example, the second surface coating 41 can be made of nickel, a nickel alloy, copper or a copper alloy. In the shown embodiment, the thickness of the cap plate 21 may be in the range of 0.2 mm to 0.8 mm, similar to the thickness of the bottom portion 12 of the can 10. However, it is understood that the thickness need not be in the range of the bottom portion 12 of the can 10, and that the coatings 41, 51 can be any film or layer disposed on the can 10.

Where the second surface coating 41 is made of nickel or a nickel alloy, a plating layer may be formed thereon by electrolytic plating or electroless plating according to an aspect of the invention. Also, the second surface coating 41 can be formed directly by deposition, such as by sputtering, according to an aspect of the invention.

Where the second surface coating 41 is made of copper or a copper alloy, a clad layer can be formed thereon by a cladding method. In this case, as shown in the embodiment of the invention in FIG. 6, a second metal layer 43 may be further provided between the second surface coating 41 and the cap plate 21. Materials of the second metal layer 43 are different from those of the cap plate 21 and the second surface coating 41 according to an aspect of the invention. Examples of the metal layer 43 include, but are not limited to, Zn, Sn, Fe, Cr and so on. The second metal layer 43 may be formed on the outer surface of the cap plate 21 by pre-treatment before formation of the second surface coating 41 according to an aspect of the invention. In such a manner, the same or similar effects as those when forming the first metal layer 39 on the bottom portion 12 can be achieved.

The second surface coating 41 can also be 0.5 μm to 200 μm in thickness, and preferably 30 μm to 100 μm according to aspects of the invention. If the thickness of the second surface coating 41 is less than 0.5 μm, uniformity in plating thickness cannot be ensured and there may occur imperfect plating (for example, local failure in plating or exfoliation). If the thickness of the first surface coating 40 is greater than 200 μm, the plating layer becomes overly thick, making it difficult to obtain a spacious internal space of the can 10. When the thickness of the second surface coating 41 is in the range of 30 μm to 100 μm, an appropriate welding strength can be ensured even and an increase in the weight and volume of the battery can also be suppressed. However, it is understood that other thickness can be used.

Figure 6:
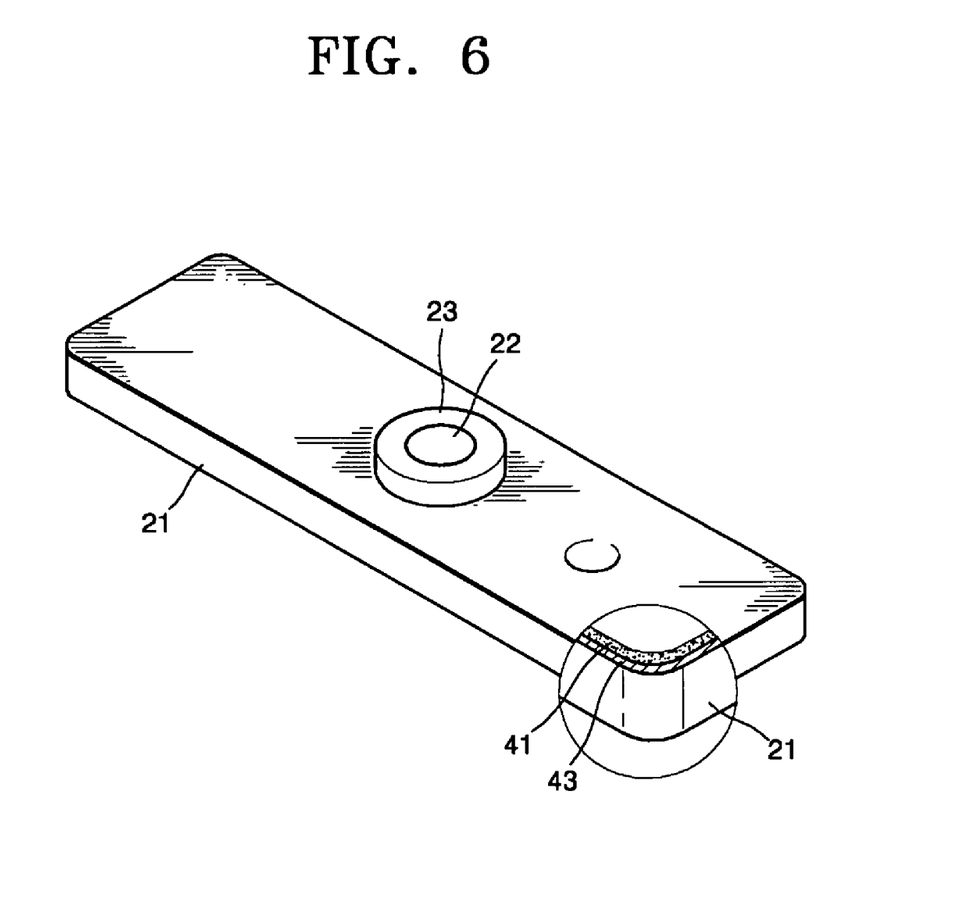
FIG. 6 is a partial perspective view of a cap plate shown in FIG. 1 on which having a metal layer and a surface coating according to another embodiment of the present invention.

The second surface coating 41 can be advantageously used for the purpose of supporting the terminal pin 22 and the cap plate 21, which is not the case where the probe (Not shown) of the initial charging and discharging device supports the terminal pin 22 and the bottom portion 12. That is, the second surface coating 41 prevents a leading edge of the probe from being contaminated by a material of the cap plate 21 (i.e., aluminum), thereby preventing inaccuracy in voltage measurement. Also, since the lead 80 connected with the safety device 70 of the battery is directly drawn out from the cap plate 21 as shown in FIGS. 5-7, a voltage drop due to elongation of the 50 lead can be suppressed. Here, the lead 80 connected to the safety device 70 can be adhered by welding, specifically resistance welding, in the case where the second surface coating 41 is made of nickel. Also, ultrasonic welding, laser welding or soldering can be employed. Thus, unlike in the conventional plate welding, various problems due to double welding can be overcome.

In connecting the lead 80 of the safety device 70 to the second surface coating 41, like in the first surface coating 40, the second surface coating 41 can be made of a material having a melting point difference of 500° C. or less (preferably 200° C. or less) from a material of the lead 80 welded thereto.

The secondary battery according to aspects of the present invention has the following and/or other effects. Since it is not necessary to weld a bottom plate to a bottom surface of a can of the battery according to an aspect of the invention, adhesion of a lead can be achieved in a simplified manner. Also, since welding of a bottom plate is not performed according to an aspect of the invention, thermal deformation of a safety vent can be prevented when the safety vent is installed on the bottom portion of the can. Further, formation of a surface coating simplifies adhesion of a lead connected to a safety device of the battery, ensuring reliability of the safety device according to an aspect of the invention. Additionally, since a thin surface coating serves as a plate according to an aspect of the invention, the overall height of the battery can be reduced and a battery capacity can be increased accordingly. Moreover, contamination of a leading edge of a probe for initially charging and discharging the battery can be prevented according to an aspect of the invention.

While a few embodiments of the present invention have been particularly shown and described with reference to embodiments thereof, it will be understood by those skilled in the art that various changes in form and details may be made therein without departing from the spirit and scope of the invention as defined by the appended claims and their equivalents.

What is claimed is:

1. A secondary battery comprising:
   an electrode unit having a positive electrode plate, a negative electrode plate and a separator disposed therebetween;
   a can having a side wall, an opening at one end of the side wall, and in which the electrode unit and an electrolytic solution are accommodated through the opening and a closed bottom portion at an opposite end of the side wall from the opening, the can comprising aluminum or an aluminum alloy;
   a cap plate directly welded at the opening to seal the can; and
   a surface coating having a thickness of 30 µm to 100 µm provided on an outer surface of only the bottom portion of the can and not provided on the side wall of the can.

2. The secondary battery of claim 1, wherein the surface coating has at least nickel as a main component.

3. The secondary battery of claim 2, wherein the surface coating is formed by at least one method selected from the group consisting of electrolytic plating, electroless plating and sputtering.

4. The secondary battery of claim 1, wherein the surface coating has at least copper as a main component.

5. The secondary battery of claim 4, wherein the surface coating is formed by at least one method selected from the group consisting of electrolytic plating, electroless plating, sputtering and cladding.

6. The secondary battery of claim 1, further comprising a safety device and a lead unit which connects the positive and negative electrode plates through the safety device, the lead unit comprising a lead electrically connected to the safety device and which is welded to the surface coating.

7. The secondary battery of claim 6, wherein the lead is welded to the surface coating by resistance welding.

8. The secondary battery of claim 7, wherein the surface coating comprises a first material, the lead comprises a second material other than the first material, and a melting point difference between the first and second materials is 500° C. or less.

9. The secondary battery of claim 8, wherein a melting point difference between the first and second materials is 200° C. or less.

10. The secondary battery of claim 4, further comprising a safety device and a lead unit which electrically connects the positive and negative electrode plates through the safety device, the lead unit comprising a lead electrically connected to the safety device and which is adhered to the surface coating by soldering.

11. The secondary battery of claim 1, further comprising a metal layer between the surface coating and the outer surface of the bottom portion of the can, wherein the metal layer comprises a first material, the can comprises a second material including the aluminum or the aluminum alloy, the surface coating comprises the second material, and the second material is different from the first material.

12. The secondary battery of claim 11, wherein the first material of the metal layer comprises at least one material selected from the group consisting of Zn, Sn, Fe and Cr.

13. The secondary battery of claim 1, wherein a thickness of the bottom portion of the can is in the range of 0.2 mm to 0.8 mm.

* * * * *